UNITED STATES PATENT OFFICE.

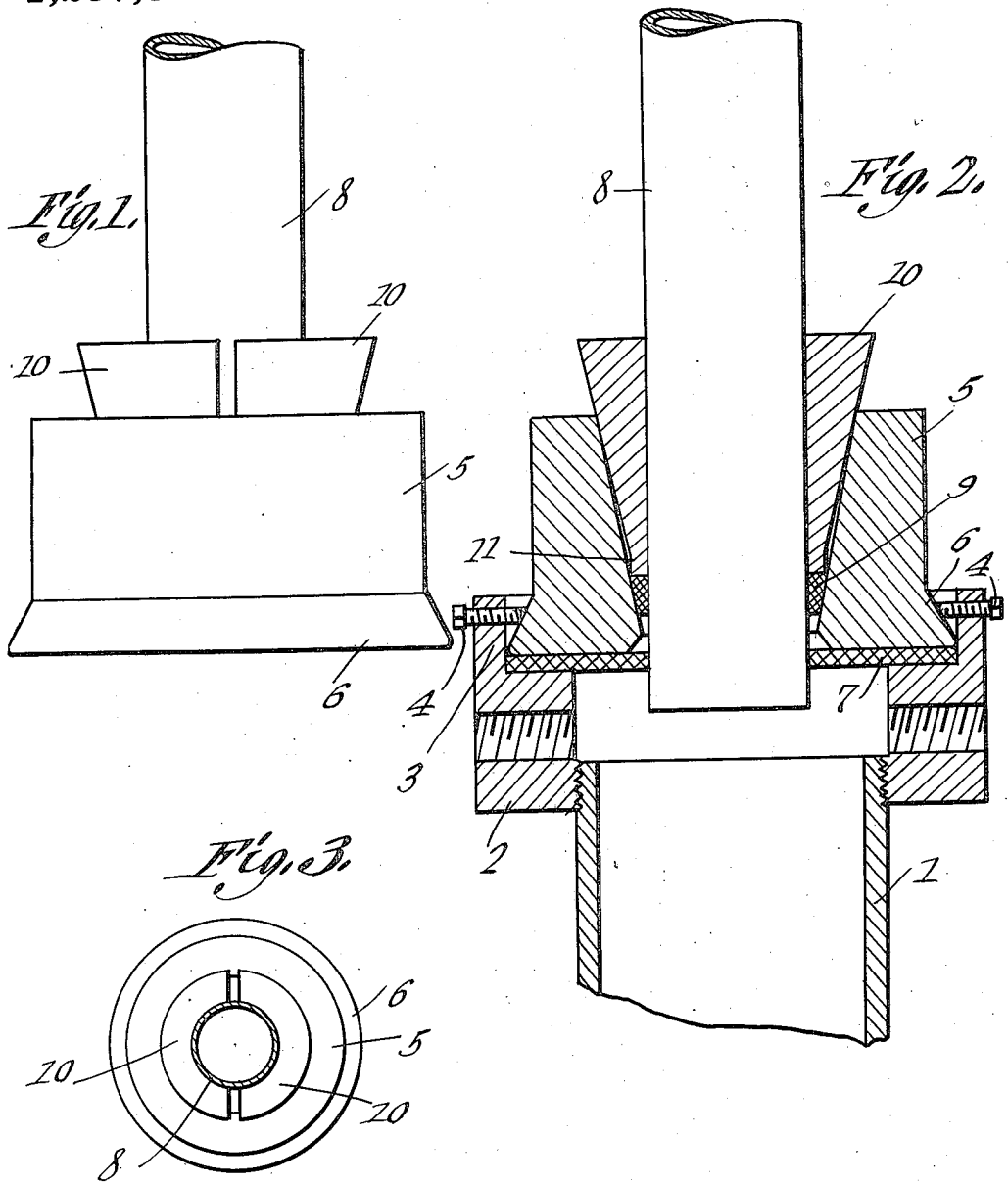

OLIVER A. HANEY, OF CLEVELAND, OKLAHOMA.

COMBINATION TUBING-RING AND CASING-HEAD.

1,297,562.    Specification of Letters Patent.    Patented Mar. 18, 1919.

Application filed October 19, 1918. Serial No. 258,856.

*To all whom it may concern:*

Be it known that I, OLIVER A. HANEY, a citizen of the United States, residing at Cleveland, in the county of Pawnee and State of Oklahoma, have invented a new and useful Combination Tubing-Ring and Casing-Head, of which the following is a specification.

The subject of this invention is a combination tubing ring and casing head for use on wells, particularly oil wells.

The main object of the invention is the provision of a tight fitting ring and head which will prevent all leakage.

Another object of the invention is the provision of means for holding the tubing, said means being quickly adjustable to the tubing.

Another object of the invention is the provision of a simple, durable and efficient tubing ring and casing head.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical structure for carrying out the invention is shown in the accompanying drawing, wherein:—

Figure 1 is a view in elevation of a ring constructed in accordance with the invention;

Fig. 2 is a central, vertical transverse section of the ring in place on a casing head;

Fig. 3 is a plan view of the ring.

Referring to the drawing by numerals of reference:—

The usual well casing is indicated by the numeral 1, and upon the casing is threaded the casing head 2, which is countersunk to provide an upstanding, annular flange 3. The flange 3 is tapped at suitable points spaced circumferentially thereof for the purpose of receiving the setscrews 4, by which the ring is held and clamped firmly in place.

The ring 5 is a cylindrical metal block which is flared at its base, as indicated by the numeral 6, to provide an inclined surface to the inner ends of the setscrews 4, so that pressure of the screws thereon may force the ring downwardly against its seat. A gasket 7, of rubber or the like, is provided in the head 2, and upon this gasket the ring 5 rests.

The ring 5 is centrally cored to allow passage therethrough to the tubing 8 and the joints of the tubing, and the walls of the core converge downwardly. Within the core, and encircling the tubing, is a packing ring 9, preferably of rubber, and this packing ring is forced into close contact with the tubing 8 by the downward thrust of a pair of wedge blocks 10. The sloping, convex faces of the wedge blocks engage the inclined walls of the core of the ring 5, while the concave faces of the blocks engage the tubing 8. These blocks are, preferably, semicylindrical for a short distance at their lower ends, as indicated most clearly at 11.

The operation of the device is as follows:—
The head 2 is screwed on the end of the casing in the usual way, the setscrews 4 backed out a sufficient distance, and the gasket 7 set in place. The ring 5 is then placed within the flange 3 and upon the gasket 7, and the screws 4 threaded inwardly to contact the flaring portion 6 and force the ring firmly upon its seat on the gasket.

The packing 9 is placed in the ring and the wedge blocks 10 inserted into the ring to rest upon the packing. The downward thrust of the wedge blocks, due to their weight and that of the tubing, will force the packing tightly about the tubing.

Having described my invention, what I claim as new is:—

1. The combination with a well casing, and a casing head having an upstanding annular flange, and setscrews threaded through the flange; of a ring seatable on the head within the flange, the ring formed with a flaring lower end, the said ring cored, the walls of the core converging downwardly, a packing ring adapted to fit within the core, and wedges insertible in the core and to rest upon the packing ring.

2. A device of the character described, including a ring formed with a flaring lower end, the said ring centrally cored, the walls of the core converging downwardly, a packing to fit in the core, and a pair of curved wedge blocks insertible in the core and adapted to seat on the packing.

In testimony that I claim the foregoing as my own, I have hereto affixed my signature in the presence of two witnesses.

OLIVER A. HANEY.

Witnesses:
  GEO. W. REYNOLDS,
  W. H. BOLES.